United States Patent [19]

Burn et al.

[11] 4,419,310
[45] Dec. 6, 1983

[54] SRTIO$_3$ BARRIER LAYER CAPACITOR

[75] Inventors: Ian Burn; Stephen M. Neirman, both of Williamstown, Mass.

[73] Assignee: Sprague Electric Company, North Adams, Mass.

[21] Appl. No.: 261,065

[22] Filed: May 6, 1981

[51] Int. Cl.$^3$ ............................................. C04B 33/32
[52] U.S. Cl. ...................... 264/59; 264/61; 264/62; 427/80; 357/10
[58] Field of Search ............... 427/80, 87, 88; 357/10; 361/321; 264/59, 61, 62

[56] References Cited

U.S. PATENT DOCUMENTS

| | | | |
|---|---|---|---|
| 3,074,804 | 1/1963 | Planer et al. | 357/10 |
| 3,124,478 | 3/1964 | Cirkler et al. | 427/80 |
| 3,386,856 | 6/1968 | Noorlander | 357/10 |
| 3,473,958 | 10/1969 | Waku | 427/88 |
| 3,569,802 | 3/1971 | Brauer | 357/10 |
| 3,570,113 | 3/1971 | Chiba | 357/10 |
| 3,859,403 | 1/1975 | Kahn | 264/61 |
| 3,933,668 | 1/1976 | Takahashi et al. | 252/63.5 |
| 3,995,300 | 11/1976 | Masumura et al. | 357/10 |
| 4,030,004 | 6/1977 | Rutt | 361/321 |
| 4,143,207 | 3/1979 | Itakura et al. | 428/539 |
| 4,283,753 | 8/1981 | Burn | 361/321 |
| 4,347,167 | 8/1982 | Payne et al. | 264/61 |

OTHER PUBLICATIONS

Heywang, Semiconducting Barium Titanate, Journal of Materials Science 6 (1971) 1214–1226.
Johnson et al., Dielectric Relaxation in Strontium Titanates Containing Rare-Earth Ions-Journal of Applied Physics, vol. 41, No. 7, Jun. 1970.

Primary Examiner—Norman Morgenstern
Assistant Examiner—Richard Bueker

[57] ABSTRACT

Formulations for a variety of air sintered ceramic barrier layer capacitors are provided wherein from 0.3 to 1.7 mole % of donor material is added to a strontium titanate and the relative amounts of strontium and titanium have been adjusted so that large-small cation balance and charge balance may be achieved by strontium vacancies, e.g.

$$Sr_{1-\frac{3}{2}x}(V_{Sr})_{\frac{1}{2}x}Y_xTiO_3.$$

These low cost materials have large grains and exhibit high dielectric constants.

11 Claims, 5 Drawing Figures

SRTIO₃ BARRIER LAYER CAPACITOR

BACKGROUND OF THE INVENTION

This invention relates to barrier layer capacitors and more particularly to such capacitors based on donor doped strontium titanate with intergranular type dielectric barrier layers.

Barrier layer capacitors are known which have ceramic bodies that generally include one or many dielectric ceramic barrier layers and include semiconducting ceramic material adjacent to the dielectric barrier layer or layers. The ceramic body is usually sandwiched between two metal electrodes. The apparent dielectric constant of the composite-ceramic body is determined in the usual way from a knowledge of (a) the capacitance as measured at the two metal electrodes, (b) the electrode area and (c) the ceramic body thickness separating the electrodes. The electrical performance characteristics of the capacitor are dependent upon the dielectric properties of the barrier layer or layers, the conductivity of the semiconducting ceramic and the particular geometry of the two. Thus, a barrier layer capacitor may be comprised of a back biased Schottky-barrier layer formed at the interface between a metal electrode and a semiconducting ceramic body. Or a so-called surface-barrier capacitor may be made by oxidizing a thin surface layer of a semiconducting ceramic body and applying a metal electrode over the oxidized dielectric layer. Dielectric barrier layers of a third kind are of particular interest here and are formed at the interfaces between the adjacent grains within the ceramic body. Such bodies are sometimes referred to as grain-interface barrier layer or interfacial polarization types. When barrier layers of the first two kinds are included, the apparent dielectric constant Ka, of the ceramic body is a function of the thickness of the body. But, for capacitors having barrier layers of the third kind, assuming a given grain size, the apparent dielectric constant is not a function of the body thickness, and thus by this test they are similar to the more common ceramic capacitor having entirely dielectric bodies.

Capacitors of the Schottky barrier type and of the surface barrier type may preferably employ a fine grained ceramic body. But, for capacitors of the grain-interface barrier type, large grained ceramic bodies are preferred because for a given thickness body, the average number of dielectric barriers existing between the electrodes is minimized, the apparent dielectric constant increases and the capacity is accordingly enhanced. Methods for making such capacitors include the early step of sintering in a reducing atmosphere in such a way as to grow large semiconducting grains. Subsequently the grain surfaces are exposed to an oxidizing agent and heated in an oxidizing atmosphere to form the dielectric grain-interface barrier layer.

In comparison with the most common type of ceramic capacitors, namely those having a wholly dielectric ceramic body, ceramic barrier layer capacitors can provide much higher apparent dielectric constants while at the same time providing a relatively low temperature coefficient of capacitance. On the other hand, the manufacture of barrier layer capacitors has heretofore entailed the costly, difficult and hazardous step of sintering or reheating in an atmosphere containing active reducing agents, e.g. hydrogen or carbon monoxide.

It is an object of this invention to provide low cost air-sintered grain-interface barrier layer capacitors.

It is a further object of the present invention to provide capacitors of the grain-interface barrier layer type wherein the ceramic body is limited to a particular narrow compositional range leading to excellent electrical properties.

SUMMARY OF THE INVENTION

A barrier layer capacitor has a ceramic body that is contacted by two spaced electrodes. The ceramic body is made up of crystalline ceramic grains of semiconducting strontium titanate and thin dielectric grain-surface layers serving as barrier layers separating the conductive bulk portions of the grains.

The grains consist essentially of a solid solution of a strontium titanate doped homogeneously with donor cations. These may be large trivalent cations such as yttrium ($Y^{3+}$), bismuth ($Bi^{3+}$) or one of the rare earths (e.g. $La^{3+}$) that will tend to substitute for strontium ($Sr^{2+}$) in the grain. Alternatively, or in combination, small pentavalent cations such as $Nb^{5+}$, $Ta^{5+}$, or $Sb^{5+}$ that will tend to substitute for the titanium cation ($Ti^{4+}$) may be used. The small cation $W^{6+}$ can also substitute for ($Ti^{4+}$). Ceramic barrier layer capacitors of this invention are more particularly defined as having semiconducting strontium titanate grains that are donor doped with from 0.3 mole % to 1.7 mole % and preferably 0.5 to 1.5 mole % of a donor or combination of donors and are so formulated that strontium vacancies considered as large cations can both provide balance between large and small cations in the crystal as well as provide overall cation charge balance.

Thus, such a composition conforms to

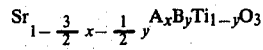

wherein strontium vacancies, will lead to a large/small cation site ratio of near unity and will simultaneously lead to charge balance.

In the method for making capacitors of this invention, the start ingredients are compounded in accordance with the above formula, formed into bodies such as chips and sintered in air to maturity. At this point in the process the bodies contain semiconductive grains and interstitial dielectric barrier layers, and the addition of electrodes forms a capacitor, albeit sometimes of relatively low insulation resistance. This is not the case for bodies fired in nitrogen (ususally equivalent to about $10^{-3}$ atmospheres of oxygen) nor is it true for bodies fired in a more reducing atmosphere containing active reducing agents (e.g. $H_2$ or CO) since these bodies are conductive.

It is preferred to diffuse oxidizing agents into the air sintered bodies to increase the insulation resistance of the dielectric barrier layers. The bodies are subsequently electroded.

The discovery of conducting grains in $SrTiO_3$ following firing in air was unexpected because the behavior is quite different from that experienced with $BaTiO_3$. In $BaTiO_3$, conducting bodies are obtained following air firing only at low donor levels, i.e., equal to or less than 0.2 mole %, whereas at higher donor levels the material has highly resistive grains. The change to resistive grains at high donor levels is usually attributed to charge compensation of the donor by barium vacancies.

In the case of SrTiO₃, however, conducting grains were obtained only at donor levels ≧0.3 mole %, and when the material was deliberately formulated to permit compensation of the donor by Sr vacancies. This stoichiometry adjustment was necessary to produce optimum grain size for a given sintering temperature and to avoid the occurrence of secondary phases. It is believed that the conductivity in the grains arises because the presence of donors and strontium vacancies weakens the strontium titanate lattice to permit increased volatility of oxygen gas during sintering. Oxygen vacancies then produce electrons by the well known reaction $O_o \rightleftharpoons V_o + 2e + \frac{1}{2}O_2(g)\uparrow$.

During cooling, oxygen may be reabsorbed on the grains to produce thin insulating grain boundary layers. Since attainable grain size was found to diminish as the donor level increased, the optimum donor level was found to lie in a range of about 0.5–1.5 mole %; the lower limit being determined by the conductivity of the grains, and the upper limit by grain size.

DESCRIPTION OF THE PREFERRED EMBODIMENTS

Figure 1:
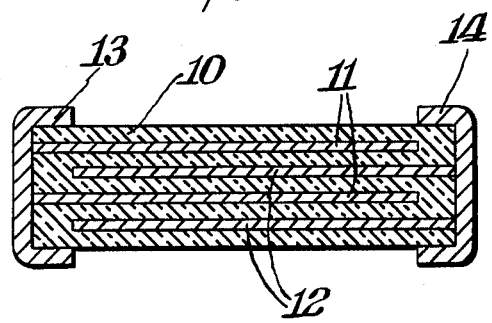
FIG. 1 shows in side sectional view a monolithic ceramic capacitor of this invention.

The monolithic ceramic capacitor of FIG. 1 has a ceramic body 10. Film electrodes 11 are interleaved with film electrodes 12, all electrodes being buried in the body 10. Conductive termination coatings 13 and 14 contact electrodes 11 and 12, respectively.

Figure 2:
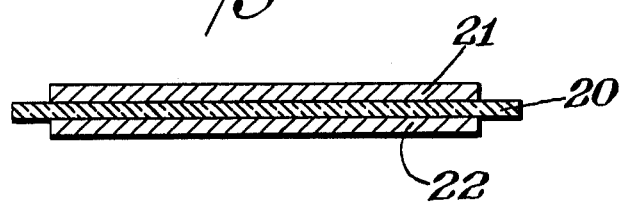
FIG. 2 shows in side sectional view a ceramic chip capacitor of this invention.

The chip capacitor of FIG. 2 has a ceramic body 20 and two film electrodes 21 and 22 on the opposite major surfaces of the body 20, respectively. Chip capacitors may have a rectangular or circular shape and for high voltages uses may have a thickness equaling or exceeding the largest dimension of a major surface.

The experimental capacitors described below were chip type capacitors as shown in FIG. 2. The sintering temperature of about 1450° C. that is appropriate, would require precious metal electrodes, e.g. of palladium for co-sintering in a monolithic type capacitor as shown in FIG. 1. Alternatively, co-sintering may be avoided by using the known technique for placing dummy electrode material in the body prior to sintering, which material disappears during sintering, and subsequently filling the resulting cavities with a low cost base metal that will serve as buried electrodes.

EXAMPLE 1

High purity SrTiO₃ having a Sr/Ti ratio of near unity was prepared. To the powdered SrTiO₃ was added 1.2 mole % yttrium oxide. Ceramic powder compositions of three groups of this powder having increasing amounts of titania added were mixed with an organic vehicle and binder. A layer of each composition about half a millimeter thick was formed, dried and cut into "squares" 10×10 millimeters. Some of these squares were sintered in air at 1450° C. for 2 hours.

TABLE I

| | SrTiO₃ (moles) | YO₁.₅ (moles) | TiO₂ (moles) | Formula |
|---|---|---|---|---|
| Ex. 1a | 0.4631 | 0.0056 | 0 | SrY$_x$TiO₃ |
| Ex. 1b | 0.4631 | 0.0056 | 0.0056 | Sr$_{1-x}$Y$_x$TiO₃ |
| Ex. 1c | 0.4631 | 0.0056 | 0.0084 | Sr$_{1-\frac{3}{2}x}$Y$_x$TiO₃ |

The bodies of Example 1c were well sintered and bottle green in color and had grains on the order of 10 μm. The bodies of Example 1b were marginally dense and pale green. The bodies of Example 1a were porous and yellow to white in color. Only the capacitors of Example 1c had recognizable capacitor properties. The bottle green color of the strontium titanate in Example 1c indicates that the ceramic grains are semiconducting and thus that a barrier layer capacitor may have been formed. This is confirmed by the electrical performance of these capacitors. It is highly significant that the formulation of only these capacitors of Example 1c is capable of being both charge balanced as well as balanced in large and small cations by inclusion at sintering of strontium vacancies V$_{Sr}$ in the SrTiO₃ lattice. The formula may be rewritten as

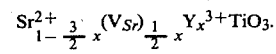
$$Sr^{2+}_{1-\frac{3}{2}x}(V_{Sr})_{\frac{1}{2}x}Y_x^{3+}TiO_3.$$

Some bodies of Example 1c were also sintered for 14½ hours.

After sintering, all of the bodies of Example 1c were painted on one major surface with a Bi/Cu paste. The paste consists of 95 wt% Bi₂O₃ and 5 wt% CuO in a very small amount of ethyl cellulose binder. The amount of this paste that was applied was equivalent to 2½% of the weight of the body. The bodies were then heated at 1100° C. for 2½ hours in order to thoroughly impregnate them with the Bi/Cu composition. Electrodes of a conventional silver paste, i.e. silver particles in an organic vehicle were applied to the two major surfaces of each square body. The bodies were then fired again at 750° C. for one hour to cure the silver electrodes.

The electrical test results are given in Table II.

TABLE II

| Sintering time at 1450° C. | 2 hours | | 14½ hours | |
|---|---|---|---|---|
| Wt. Bi/Cu paste | 2.5% | 5.0% | 1.0% | 2.5% |
| Capacitance (pF) 1 KHz, 1 V.RMS) | 7740 | 7317 | 16,050 | 14,820 |
| Ka | 7900 | 7800 | 18,100 | 17,900 |
| DF (%) (1 KHz, 1 V.RMS) | 0.29 | 0.26 | 0.50 | 0.39 |
| IR (ΩF) | 1140 | 1110 | 1250 | 1575 |
| AC Breakdown (volts/mm) | 1900 | 2400 | 2500 | 2000 |

The grain size of the parts sintered for 14½ hours was as great as 40 μm, explaining the mechanism by which the dielectric Ka was increased. The larger the grains, the fewer the number of barrier layers that are interposed in the ceramic body between the two silver electrodes.

EXAMPLE 2

Five groups of barrier layer capacitors were made wherein varying additions of $SrCO_3$ were made to a commercial $SrTiO_3$ of high purity but inexact Sr/Ti stoichiometry. Squares were made as in Example 1. The ceramic squares were sintered at 1450° C. for 14 hours. Indium-gallium electrodes were then applied. No oxidizing paste was used. Table III shows the amounts of the additives introduced prior to sintering and the ultimate apparent dielectric constant Ka of each of the five capacitor groups.

TABLE III

|        | Nb (mole %) | $SrCO_3$ (mole %) | Ka     |
|--------|-------------|-------------------|--------|
| Ex. 2a | 0.7         | 0                 | 3,000  |
| Ex. 2b | 0.7         | 0.35              | 8,000  |
| Ex. 2c | 0.7         | 0.6               | 9,100  |
| Ex. 2d | 0.7         | 0.85              | 14,100 |
| Ex. 2e | 0.7         | 1.0               | 6,300  |

Capacitors of Example 2d have the largest grains and largest Ka indicating that this composition most nearly corresponds to $$Sr_{1-\frac{1}{2}x}(V_{Sr})_{\frac{1}{2}x}Nb_x^{5+}Ti_{1-x}O_3.$$

The two holes associated with each strontium vacancy $V_{Sr}$ charge compensate two of the niobium donors. But for the small cation $Nb^{5+}$, the system needs additional strontium for large/small balance.

By this direct experimental means, it was determined that this lot of commercial $SrTiO_3$ contained very nearly 0.5 mole percent excess titania $$\left(0.85 - \frac{0.7}{2}\right).$$

This method for determining the large/small stoichiometry of the start material is potentially more accurate than are chemical analyses of the grains, e.g. electron probe microanalysis.

Figure 3:
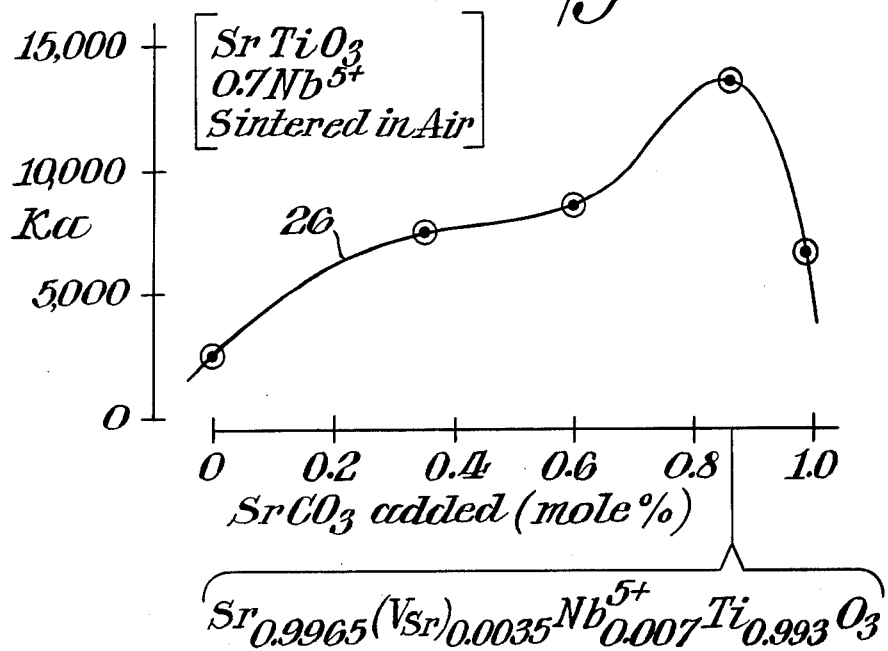
FIG. 3 is a graph showing the change in apparent dielectric constant, Ka as a function of stoichiometry in an air sintered strontium titanate doped with 0.7 mole % niobium.

This data from Examples 2a through 2e is plotted in FIG. 3 wherein the indicated curve 26 peaks sharply at the point of maximum apparent dielectric constant (corresponding to 0.85 mole % $SrCO_3$ addition). Therefore, in order to realize the greater benefits of this behavior, the Ti/Sr molar ratio must be at this optimum value within about +0.15 to −0.65 mole %, i.e. in this case the strontium addition should lie between 0.2 and 1.0 mole %.

EXAMPLE 3

Figure 4:
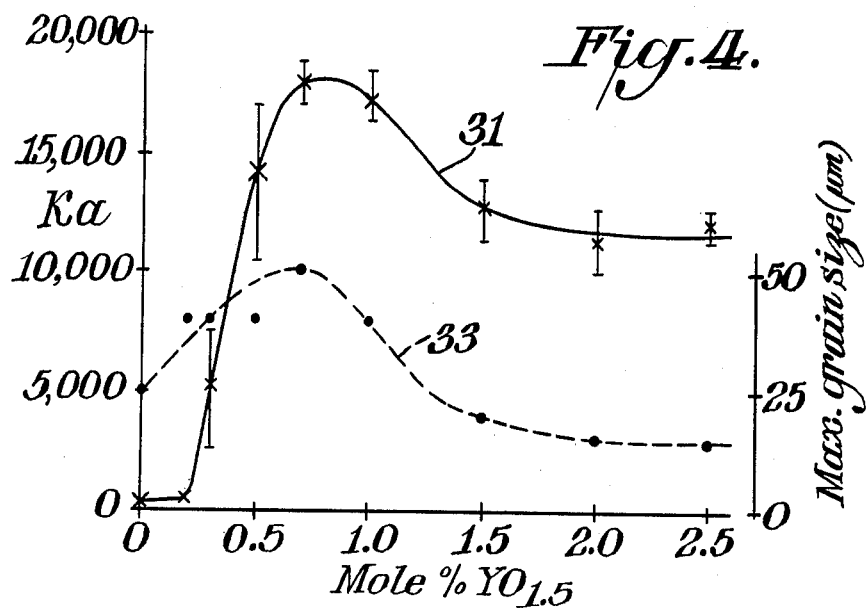
FIG. 4 shows curves of grain size and dielectric constant plotted as a function of donor level in strontium titanate barrier layer capacitors of this invention having a small excess of titania.

Now, using the $SrTiO_3$ of Example 2, which has been determined to have a 0.5 mole % excess of titania, a group of capacitors was made for which varying amounts of the large donor yttrium ($Y^{+3}$) were incorporated. However, in this experiment, the composition of each body consists of the start strontium titanate, to which we assign a 100 mole % quantity; X mole % yttrium; and 1 5X mole % titania. These compositions would conform to the formula given for bodies of Example 1c if there had been no excess titania in the start strontium titanate. In fact, the large/small cation ratio is less than unity, namely 0.995. These capacitor bodies were sintered in air at 1450° C. for 14½ hours and subsequently indium-gallium electrodes were applied. No oxidizing paste was used. The larger grains were measured and the apparent dielectric constant Ka of each sample capacitor was determined. There were six samples in each group. This data is plotted in FIG. 4 wherein the mean as well as the range of the values for each parameter of each capacitor group is indicated. Curves 31 and 33 were drawn through this data representing dielectric constants and grain size, respectively, for the nine capacitor groups of Example 3.

Grain growth and Ka were greatest for about a 0.7 mole % yttrium addition. For further increases, Ka decreases reaching a point of diminishing returns at about 1.7 mole % yttrium, a practical upper limit.

EXAMPLE 4

The experiment of Example 3 was modified by formulating the ceramic capacitor bodies so as to account for the 0.5 mole % excess titania in the start strontium titanate. This modification in procedure only required decreasing the amount of titania added for each body of Example 3 by 0.5 mole %. Thus the large/small cation ratio of these compositions becomes very nearly unity after sintering and they conform almost exactly to the formula $$Sr_{1-\frac{3}{2}x}(V_{Sr})_{\frac{1}{2}x}Y_xTiO_3$$

as for Example 1c.

Figure 5:
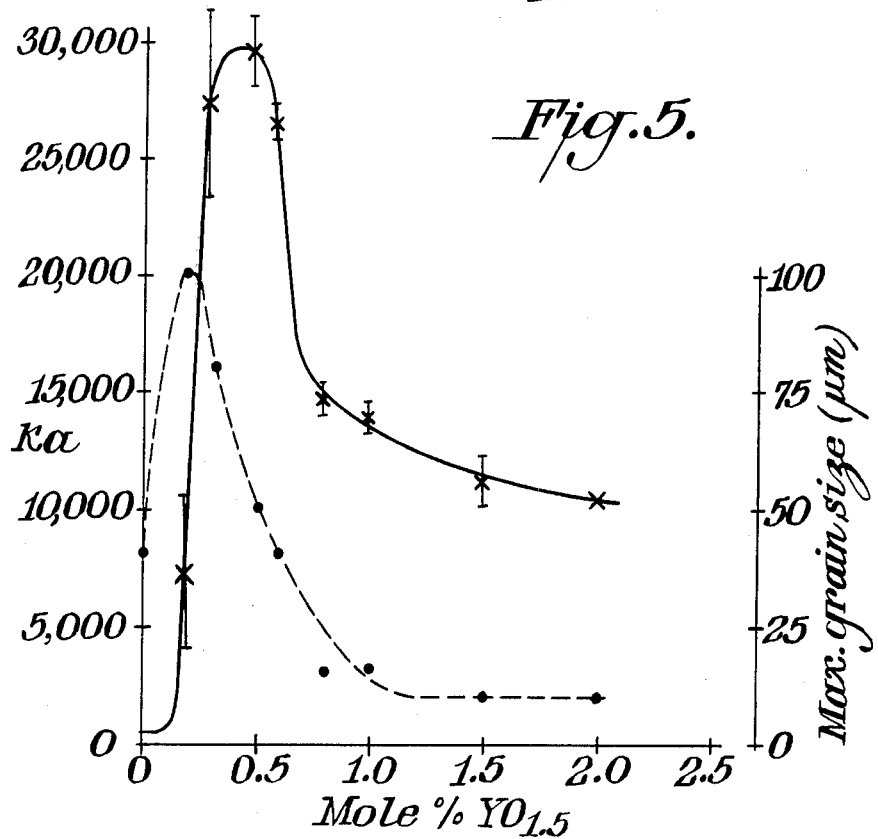
FIG. 5 shows curves of grain size and dielectric constant plotted as a function of donor level in strontium titanate barrier layer capacitors of this invention that are balanced in large and small cations.

The results of the measurements are shown in FIG. 5. Peak Ka occurs for about 0.5 mole % yttrium while maximum grain growth occurs at about 0.2 mole % of the donor. These more nearly stoichiometric compositions of Example 4 can produce higher dielectric constants Ka than those of Example 3. The lower limit of practical value for donor content is seen from FIG. 5 to be about 0.3 mole %.

As has been demonstrated in Examples 2, 3 and 4 bodies having high dielectric constants are produced at the air sintering step, unlike for barrier layer capacitors that are sintered in a partial oxygen pressure (e.g. nitrogen) atmosphere or one in which active reducing agents, e.g. $H_2$ or CO, are employed.

The application of $Bi_2O_3$ or $Bi_2O_3$ and CuO to one or both sides of the sintered bodies and subsequent heating is believed to provide a molten and highly mobile fluid that impregnates the body, entering the interstices between the grains. These pastes serve as an oxidizing means, probably providing a route by which oxygen from the atmosphere rapidly diffuses to the surfaces of the grains. The remaining oxygen vacancies in the intergranular dielectric layers is believed to be filled or "oxidized" in this manner. This oxidation step has the effect of increasing the insulation resistance. It also has the effect of decreasing somewhat the apparent dielectric constant Ka, probably as a result of increasing the thickness of the intergranular dielectric layers.

EXAMPLES 5 THROUGH 10

The experimental barrier layer capacitors of Examples 5-10 illustrate the use according to this invention of other donor dopants. The start materials for each of these experimental groups of barrier layer capacitors is presented in Table IV along with the anticipated reaction product formula and the approximate size of the larger grains in each capacitor body as determined by optical microscope pictures of the surface of the bodies after sintering. Sintering was at 1450° C. in air for 15 hours. The bodies were impregnated with the Bi/Cu paste of Example 1 and heated at 1100° C. to improve insulation resistance in accordance with known practice.

EXAMPLE 11

Ceramic bodies that were compounded and sintered as in Example 1c were coated on both major surfaces by a mixture of metal powder composed of 70 wt % Ag, 30 wt% Pd and the aforementioned Bi/Cu paste. They were then heated in air at 1100° C. for 2½ hours to impregnate the bodies with the oxidizing agent and to

TABLE IV

| | (moles) | | | | Grain size |
|---|---|---|---|---|---|
| Ex. | SrTiO$_3$ | Donor | TiO$_2$ | SrCO$_3$ | Formula | ($\mu$m) |
| 5 | 0.4631 | 0.0047Nd | 0.0070 | — | $Sr_{1-\frac{3}{2}x}(V_{Sr})_{\frac{1}{2}x}Nd_x^{3+}TiO_3$ | 50 |
| 6 | 0.4631 | 0.0047La | 0.0070 | — | $Sr_{1-\frac{3}{2}x}(V_{Sr})_{\frac{1}{2}x}La_x^{3+}TiO_3$ | 35 |
| 7 | 0.4631 | 0.0047Ta | — | 0.0023 | $Sr_{1-\frac{1}{2}x}(V_{Sr})_{\frac{1}{2}x}Ta_x^{5+}Ti_{1-x}O_3$ | 50 |
| 8 | 0.4631 | 0.0032Nb | — | 0.0027 | $Sr_{1-\frac{1}{2}x}(V_{Sr})_{\frac{1}{2}x}Nb_x^{5+}Ti_{1-x}O_3$ | 60 |
| 9 | 0.4631 | 0.0032Ce | 0.0042 | — | $Sr_{1-\frac{3}{2}x}(V_{Sr})_{\frac{1}{2}x}Ce_x^{3+}TiO_3$ | 50 |
| 10 | 0.4631 | 0.0046Ce | 0.0053 | — | $Sr_{1-\frac{3}{2}x}(V_{Sr})_{\frac{1}{2}x}Ce_x^{3+}TiO_3$ | 25 |

Silver electrodes were applied. The electrical performance of these capacitors is summarized in Table V

TABLE V

| Ex. | Donor | Ka | DF (%) at 1 KHz | IR (ΩF) at 50 V | B.D. Voltage (volts/mm) |
|---|---|---|---|---|---|
| 5 | Nd | 9,600 | 0.71 | 860 | 2200 |
| 6 | La | 10,900 | 0.90 | 960 | 1600 |
| 7 | Ta | 11,100 | 1.0 | 520 | 1200 |
| 8 | Nb | 11,600 | 0.24 | 1890 | 1400 |
| 9 | Ce | 7,600 | 1.8 | 670 | 3400 |
| 10 | Ce | 7,000 | 0.50 | 730 | 3200 |

The start SrTiO$_3$ for Examples 5, 6 and 7 was closely stoichiometric in large/small cations while that for Examples 8, 9 and 10 contained an excess of about 0.001 moles (0.2 mole %) titania and the stoichiometry was adjusted empirically to maximize grain size. Cerium clearly functions in essentially the same manner but not as well as the other rare earths according to the principles of this invention.

provide silver palladium electrodes, such as might be used in the future for making monolithic barrier layer capacitors, e.g. as in FIG. 1, with co-fired buried electrodes (11 and 12). Good electrical properties were obtained, namely Ka=16,000, DF=0.55% and IR=2100 ΩF.

EXAMPLES 12-17

Other barrier capacitors are illustrated in Examples 12-17. The start strontium titanate material was the same high purity material used in Example 1. Various donors were used. After sintering in air at 1450° C. for 15 hours the bodies were impregnated and electroded as in Example 11.

The compositions and formulas for each are given in Table VI along with the larger grain sizes observed.

TABLE VI

| | (moles) | | | | | Grain size |
|---|---|---|---|---|---|---|
| Example | SrTiO$_3$ | Donor | TiO$_2$ | SrCO$_3$ | Formula | ($\mu$m) |
| 12 | 0.4631 | 0.0047Y | 0.0070 | — | $Sr_{1-\frac{3}{2}x}(V_{Sr})_{\frac{1}{2}x}Y_x^{3+}TiO_3$ | 65 |
| 13 | 0.4631 | 0.0047Ho | 0.0070 | — | $Sr_{1-\frac{3}{2}x}(V_{Sr})_{\frac{1}{2}x}Ho_x^{3+}TiO_3$ | 50 |
| 14 | 0.4631 | 0.0047Bi | 0.0070 | — | $Sr_{1-\frac{3}{2}x}(V_{Sr})_{\frac{1}{2}x}Bi_x^{3+}TiO_3$ | 20 |
| 15 | 0.4631 | 0.0047Bi | — | 0.0023 | $Sr_{1-\frac{1}{2}x}(V_{Sr})_{\frac{1}{2}x}Bi_x^{5+}Ti_{1-x}O_3$ | 2 |
| 16 | 0.4631 | 0.0047Sb | — | 0.0023 | $Sr_{1-\frac{1}{2}x}(V_{Sr})_{\frac{1}{2}x}Sb_x^{5+}Ti_{1-x}O_3$ | 90 |
| 17 | 0.4631 | 0.0023W | — | — | $Sr_{1-x}(V_{Sr})_xW_x^{6+}Ti_{1-x}O_3$ | 50 |

In Table VII is presented the electrical data. Since it was questionable whether bismuth would enter the grains as a large cation (Bi$^{+3}$) or a small cation (Bi$^{+5}$), formulations for each were provided, Examples 14 and 15, respectively. Bismuth is clearly a large cation in this system.

TABLE VII

| Ex. | Donor(s) | Ka | DF (%) | IR (ΩF) | B.D. Voltage volts/mm |
|---|---|---|---|---|---|
| 12 | Y | 20,000 | 0.62 | 1470 | 2100 |
| 13 | Ho | 19,000 | 0.70 | 2500 | 1900 |
| 14 | Bi | 7,000 | 0.75 | 1250 | 2300 |
| 15 | Bi | 300 | 0.08 | 1470 | 3300 |
| 16 | Sb | 20,000 | 0.68 | 1420 | 1600 |
| 17 | W | 13,000 | 0.72 | 1100 | 1600 |

EXAMPLES 18-20

The start material for the capacitors of Examples 18, 19 and 20 includes the same strontium titanate used in Examples 2, 3 and 4. The start materials also included appropriate amounts of titania for an optimum stoichiometry balance as in Example 4.

Examples 18 demonstrates the combination in one body of two donors having the good properties that were predicted following the formulation principles of this invention.

Example 19 demonstrates the feasibility of impregnating the body with Bi/Cu paste to reoxidize the grain boundaries and simultaneously firing a relatively low cost pure silver metal electrode at a temperature less than that of the melting point of silver. The aforementioned Bi/Cu paste was mixed with an electroding paste containing only silver metal particles. This combination paste was applied to the two opposite faces of the body having been air sintered at 1450° C. for 15 hours. The body was then fired in air at 900° C. for 10 hours simultaneously accomplishing both reoxidation and electroding.

Capacitors of Example 20 were made in the same way as those in Example 19 with one exception. At the end of the 15 hour sintering period, nitrogen displaced the air atmosphere and cooling ws effected in this inert atmosphere.

Table VIII provides the composition and formula for each example and Table IX shows the results obtained.

TABLE VIII

| Example | Additives (mole %) | Formula |
|---|---|---|
| 18 | 0.7Sb 0.4Y | $Sr_{1-\frac{3}{2}x-\frac{1}{2}y}(V_{Sr})_{\frac{1}{2}x+\frac{1}{2}y}Y_x^{3+}Sb_y^{5+}Ti_{1-y}O_3$ |
| 19 | 0.5Y 0.15Ti | $Sr_{1-\frac{3}{2}x}(V_{Sr})_{\frac{1}{2}x}Y_x^{3+}TiO_3$ |
| 20 | 0.5Y 0.15Ti | $Sr_{1-\frac{3}{2}x}(V_{Sr})_{\frac{1}{2}x}Y_x^{3+}TiO_3$ |

TABLE IX

| Ex | Donor | Ka | D.F. (%) | IR (ΩF) | (volts/mm) |
|---|---|---|---|---|---|
| 18 | Sb/Y | 16,400 | 0.30 | 1800 | 2100 |
| 19 | Y | 16,500 | 0.23 | 2300 | 2950 |
| 20 | Y | 29,400 | 0.10 | 1900 | 1650 |

The combined oxidizing and electroding paste of Examples 19 and 20 may be used to make monolithic barrier layer capacitors having pure silver electrodes. The paste would replace dummy electrodes in the air sintered body of this invention and subsequently fired at about 900° C.

The large increase in apparent dielectric constant, Ka, for the nitrogen cooled capacitors of Example 20 and the commensurate decrease in breakdown voltage suggests that the nitrogen cooling caused a decrease in the thickness of the dielectric barrier layers themselves without substantial effect upon the quality of the barrier layer dielectric.

What is claimed is:

1. A method for making an intergranular barrier layer type capacitor without heating in a reduced atmosphere comprising:
   (a) preparing a ceramic start mixture consisting essentially of strontium, titanium and strontium-titanate donor compounds, said donors being selected from large cations A, small cations B and combinations thereof, said start mixture being adjusted to form during sintering a ceramic compound selected from $$Sr_{1-\frac{3}{2}x}A_xTiO_3$$

$$Sr_{1-\frac{1}{2}y}B_yTi_{1-y}O_3$$

$$Sr_{1-w}B_wTi_{1-w}O_3$$

and combinations thereof, to wit $$Sr_{1-\frac{3}{2}x-\frac{1}{2}y-w}A_xB_yB_wTi_{1-y-w}O_3$$

wherein x, y and w are the atomic proportions, respectively, of said donor cations having a charge of +3, +5 and +6, so that both charge balance and large/small cation balance may be established by strontium vacancies, $(V_{Sr})\frac{1}{2}x+\frac{1}{2}y+w$ therein, and wherein $x+y+w$ is from 0.003 to 0.017;
   (b) forming a body of said mixture;
   (c) sintering said body in air to maturity to form in said body semiconductive grains and interstitial dielectric barrier layers;
   (d) diffusing oxidizing agents containing bismuth into said body to increase the insulation resistance of said interstitial barrier layers; and
   (e) forming two spaced electrodes in contact with said body.

2. The method of claim 1 wherein said sum $x+y+w$ is about 0.007.

3. The method of claim 1 wherein said sintering is about 1450° C. for at least 10 hours.

4. The method of claim 1 wherein said oxidizing agent is comprised of oxides of bismuth and copper.

5. The method of claim 1 wherein said forming said electrodes comprises, during said forming a body, interleaving between layers of said mixture, films of an electroding paste prior to said sintering, to produce a monolithic type capacitor.

6. The method of claim 5 wherein said electroding paste is comprised of an organic vehicle and metal selected from silver, palladium and combinations thereof.

7. The method of claim 5 wherein said forming of said body includes placing dummy electrode material in said body prior to said sintering, driving off said dummy material during said sintering; and wherein said forming of said electrodes includes filling the cavities left by said disappeared dummy electrodes with said electroding paste and firing said body to cure said electrodes.

8. The method of claim 7 wherein said electroding paste metal consists essentially of silver, wherein said firing is at a temperature less than the melting temperature of said metal.

9. The method of claim 7 wherein said electroding paste is additionally comprised of said oxidizing agent to simultaneously effect said forming said electrodes and diffusing said oxidizing agents.

10. The method of claim 9 wherein said electroding metal is silver and said firing is accomplished at about 900° C.

11. The method of claim 1 additionally comprising, after said sintering in air to maturity, cooling said bodies in a predominantly inert gas atmosphere.

* * * * *

UNITED STATES PATENT AND TRADEMARK OFFICE
CERTIFICATE OF CORRECTION

PATENT NO. : 4,419,310
DATED      : December 6, 1983
INVENTOR(S) : Ian Burn et al It is certified that error appears in the above—identified patent and that said Letters Patent is hereby corrected as shown below:

Cover page, under "[56] References Cited", the following reference should be listed:

-- U.S. PATENT DOCUMENTS 4,309,295     1/1982     McSweeney     427/80 --

Column 3, line 51, "voltages" should read -- voltage --
Column 5, line 65, "1 5X" should read -- 1.5X --
Column 9, line 39, "ws" should read -- was --

Signed and Sealed this

Twenty-ninth Day of May 1984

[SEAL]

Attest:

GERALD J. MOSSINGHOFF

Attesting Officer     Commissioner of Patents and Trademarks